ably flush so as not to project beyond the
UNITED STATES PATENT OFFICE.

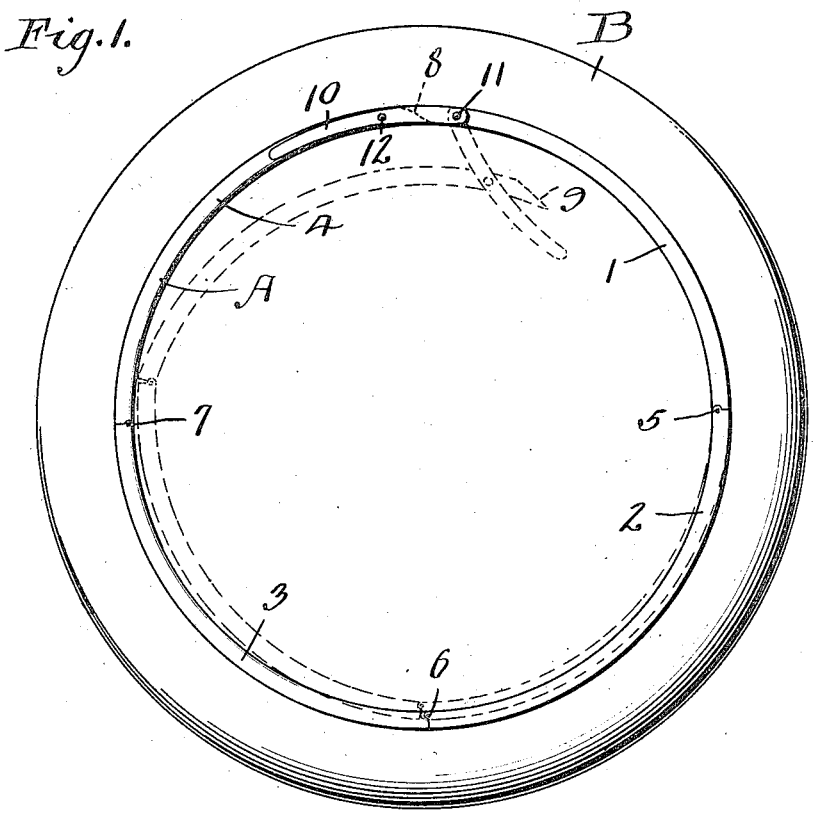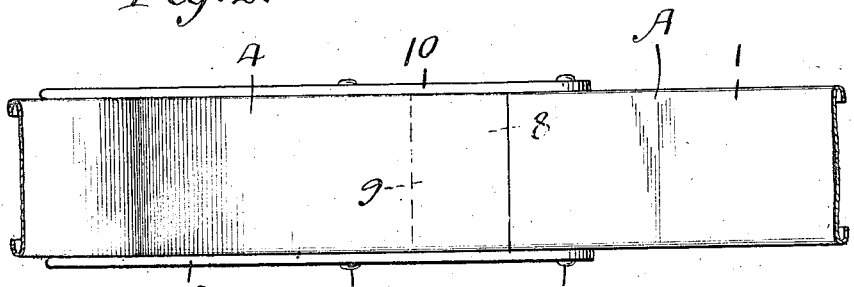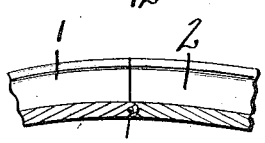

WALTER B. CHRISTOPHER, OF BIRMINGHAM, ALABAMA, ASSIGNOR OF ONE-HALF TO CAD C. BAXTER, OF BIRMINGHAM, ALABAMA.

COLLAPSIBLE RIM.

1,154,288.

Specification of Letters Patent. Patented Sept. 21, 1915.

Application filed November 27, 1914. Serial No. 874,296.

*To all whom it may concern:*

Be it known that I, WALTER B. CHRISTOPHER, a citizen of the United States, residing at Birmingham, in the county of Jefferson and State of Alabama, have invented new and useful Improvements in Collapsible Rims, of which the following is a specification.

This invention relates to collapsible and demountable vehicle wheel rims, the object in view being to provide a particularly simple and reliable rim constructed and provided with means whereby it may be readily collapsed and as readily expanded when the rim and tire are removed from the wheel, the felly of the wheel serving to prevent accidental collapse of the rim when the rim is in its working relation to the felly of the wheel.

With the above and other objects in view, the invention consists in the novel construction, combination and arrangement of parts, as herein described, illustrated and claimed.

In the accompanying drawings:—Figure 1 is a side elevation of the collapsible rim of this invention in its applied relation to a tire, indicating by dotted lines the manner of collapsing the rim. Fig. 2 is an inside face view of the meeting extremities of the collapsible rim and the operating lever. Fig. 3 is a fragmentary section showing one of the hinge joints.

Referring to the drawings A designates generally the collapsible tire holding vehicle wheel rim of this invention, and B a tire mounted on said rim. The rim comprises a plurality of arcuate sections 1, 2, 3 and 4, the sections 1 and 2 being hinged together at 5, the sections 2 and 3 being hinged together at 6 and the sections 3 and 4 being hinged together at 7.

The abutting ends of the sections 1 and 4 are not hinged together but are adapted to move into and out of alinement with each other and in carrying out this part of the invention, the meeting extremities of the sections 1 and 4 are reversely beveled as shown at 8 and 9 so as to permit them to be moved into and out of abutting relation. The means for shifting the meeting extremities of the sections 1 and 2 comprises one of a pair of levers 10, a pair of such levers being preferably employed and arranged at opposite sides of the end portions of the sections 1 and 4 to which they are pivotally connected at 11 and 12. The distance between the pivots 11 and 12 is in practice equal to the sum of the length of the projecting extremities of the sections 1 and 4 beyond the said pivots. Therefore, when the levers 10 are moved outwardly so as to lie by the side of and in longitudinal alinement with the meeting ends of the sections 1 and 4, the beveled extremities 8 and 9 of said sections will lie in contact with each other thereby forming a practically continuous circular rim. The levers 10 are preferably curved on the same arc as the rim A as a whole and the hinges 5, 6 and 7 are preferably flush so as not to project beyond the inner face of the rim. This permits the rim to be placed snugly on the felly of the wheel and when in place thereon, it is impossible for the rim to collapse. The levers 10 lie close to the sides of the rim and conform in curvature thereto so that they may not be interfered with and their presence is hardly noticeable.

What I claim is:—

In a demountable rim for vehicle wheels, the combination with a wheel, of a rim embodying a circular series of hingedly connected sections, and a pair of arcuate levers pivotally attached to the side edges of the terminal sections and adapted to move the extremities thereof into and out of alinement, said levers lying between the outer and inner peripheral lines of the sections to which they are attached when said sections are in alinement, said levers are overlapping the joint between the last named sections and bearing against the side edges thereof.

In testimony whereof I affix my signature in presence of two witnesses.

WALTER B. CHRISTOPHER.

Witnesses:
 R. D. JOHNSTON, Jr.,
 NOMIE WELSH.

Copies of this patent may be obtained for five cents each, by addressing the "Commissioner of Patents, Washington, D. C."